April 10, 1928.  1,665,888
J. R. LITTY
CAKE SPLITTING MACHINE
Filed Sept. 21, 1925   5 Sheets-Sheet 1
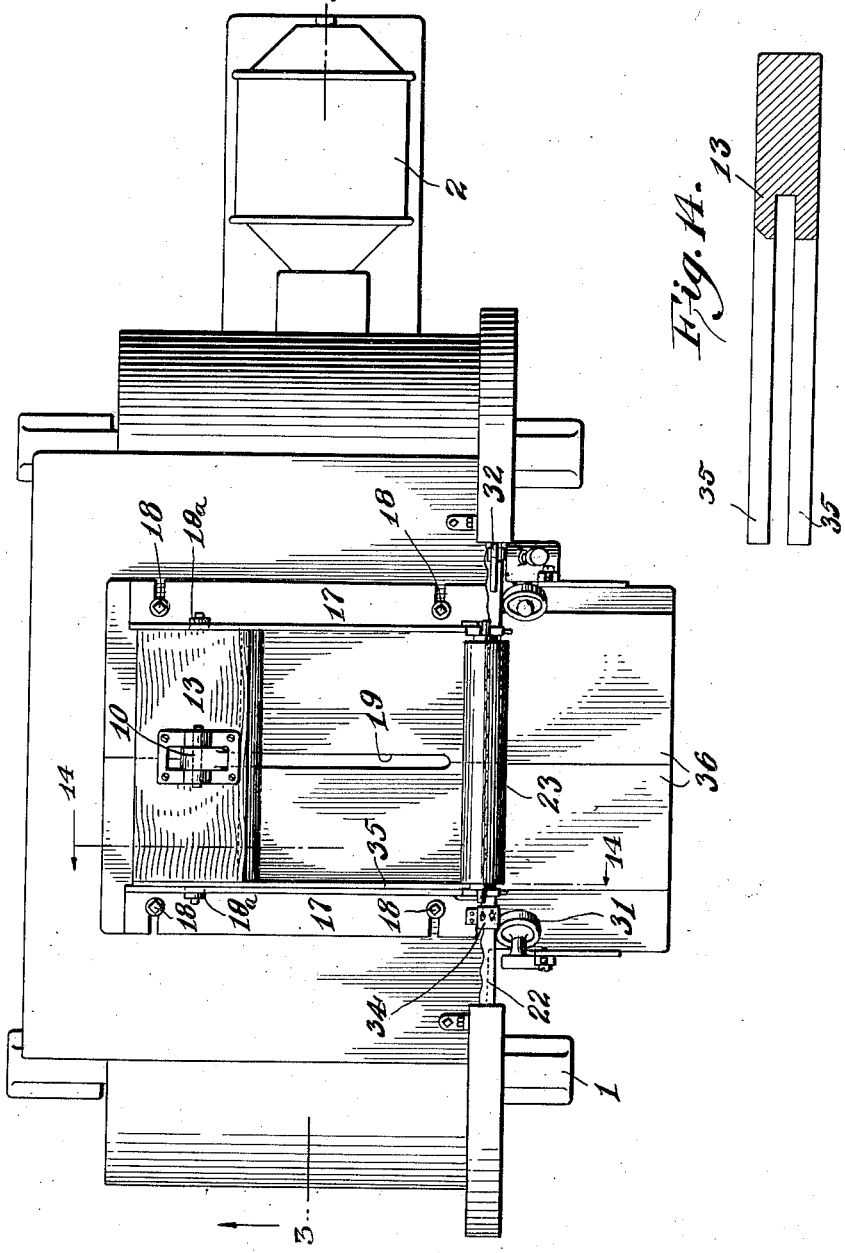
Witnesses:
Virgil L. Mayer
George A. Gruss
Inventor,
John R. Litty
By Joshua R. H. Potts
HIS Attorney.

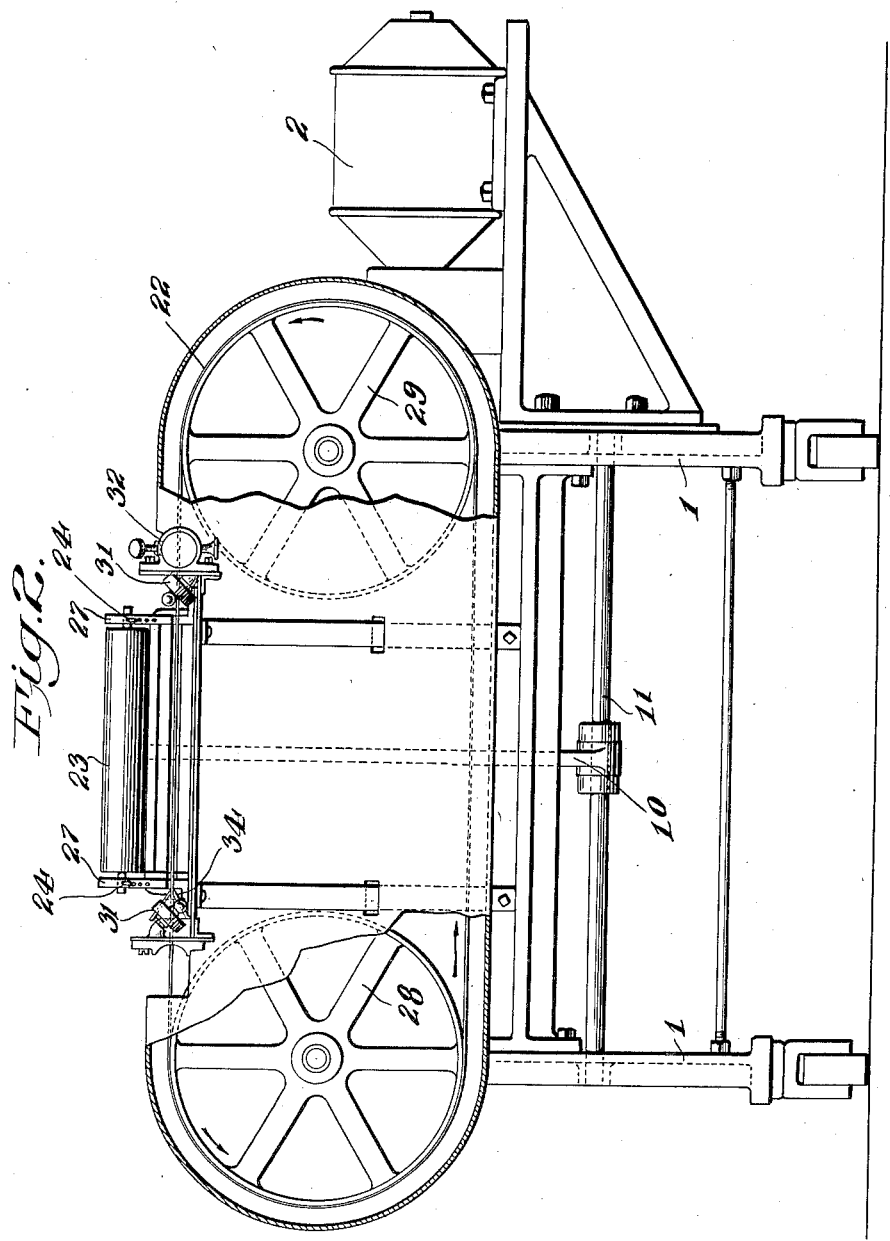

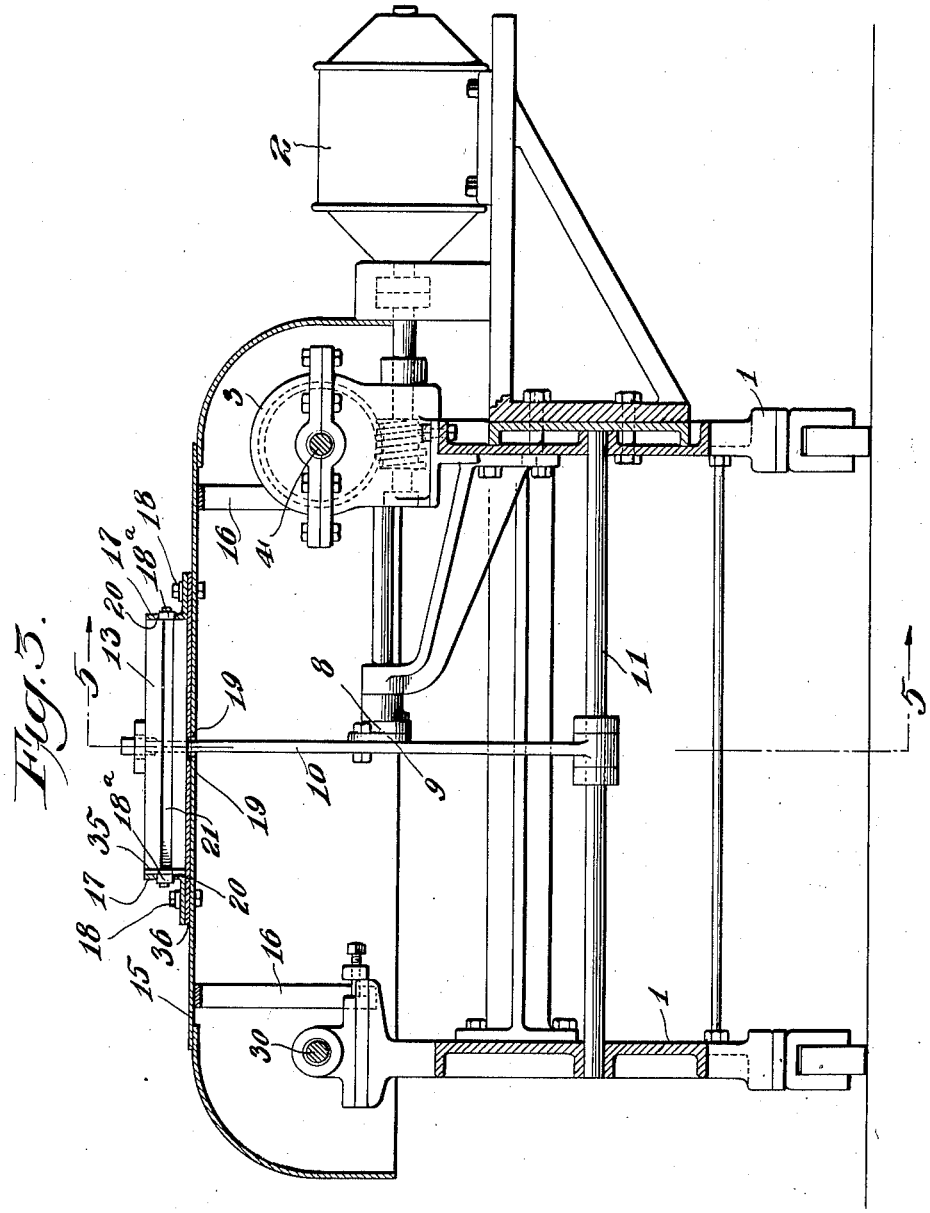

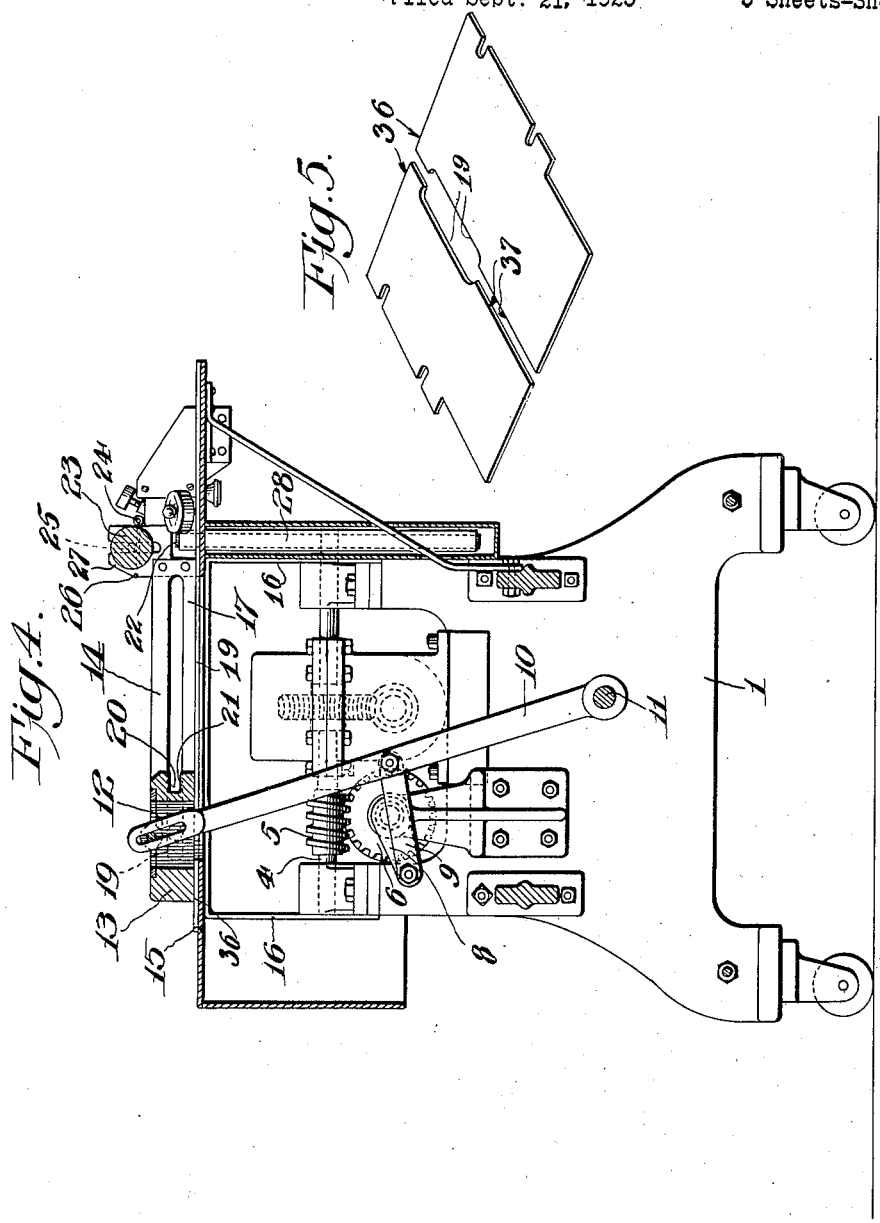

April 10, 1928.
J. R. LITTY
1,665,888
CAKE SPLITTING MACHINE
Filed Sept. 21, 1925     5 Sheets-Sheet 5
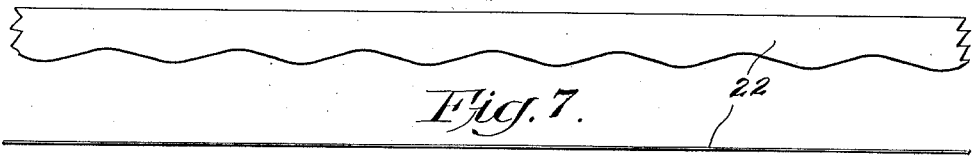
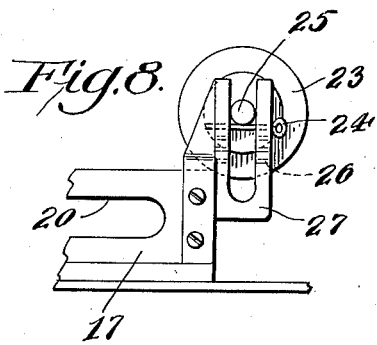 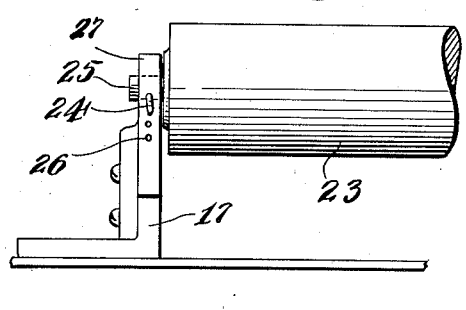
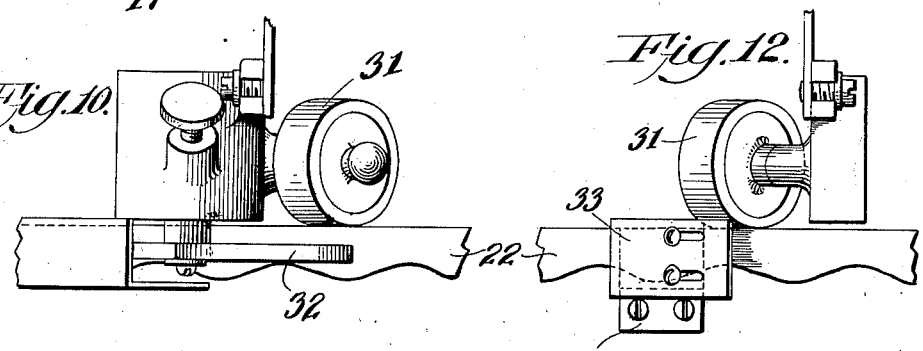
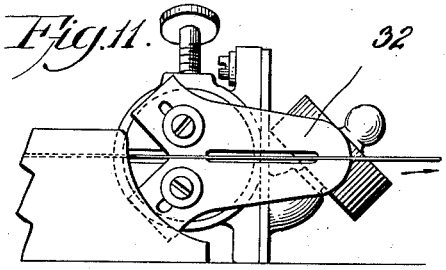 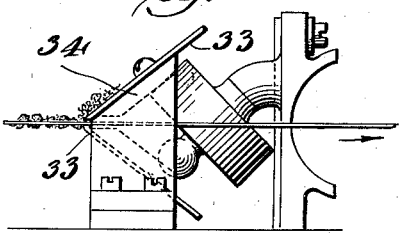
Witnesses:
Virgil L. Maier
George A. Gress
Inventor,
John R. Litty
By
Joshua R. H. Potts
His Attorney.

Patented Apr. 10, 1928.

1,665,888

UNITED STATES PATENT OFFICE.

JOHN R. LITTY, OF PHILADELPHIA, PENNSYLVANIA.

CAKE-SPLITTING MACHINE.

Application filed September 21, 1925. Serial No. 57,520.

My invention relates to cake-splitting machines, and is especially designed for use in making layer-cake.

One method of making layer cake is to bake as many cakes as there are to be layers. The chief objection to this plan is that the amount of time necessary for making and the space required for baking the cake is duplicated for each layer, which makes a layer cake costly. Splitting cakes of the thickness of two layers, so far as I am aware, has heretofore proved unsatisfactory.

The object of my invention is to provide a machine with which cakes may be quickly and evenly split without danger of breakage, which may be adjusted for splitting cakes of different thicknesses, and in which the splitting knife will be automatically cleansed after each cut.

This object, and other advantageous ends which will be described hereinafter, I attain in the following manner, reference being had to the accompanying drawings in which Figure 1 is a plan view of a cake-splitting machine constructed in accordance with my invention, Figure 2, a front view of the machine shown in Figure 1, some parts being broken away, Figure 3, a section on line 3—3 of Figure 1, Figure 4, a section on line 4—4 of Figure 3, Figure 5, a perspective view of elements forming a part of my invention, Figures 6 and 7, fragmentary plan and edge views of a band knife used in the machine shown in Figure 1, Figures 8 and 9, enlarged fragmentary end and front views of a cake retaining roll forming a part of my invention, Figures 10 and 11, fragmentary enlarged plan and rear views of guiding means for the band knife, Figures 12 and 13, fragmentary enlarged plan and rear views of the knife cleaning unit, and Figure 14, an enlarged section on line 14—14 of Figure 1.

Briefly the machine consists of a suitable frame; a band knife; mechanism for moving the band knife; a cake-receiving channel leading to the band knife; a reciprocating cake-pushing member movably connected within the channel for moving the cake against the knife; a lever for moving the cake-pushing member; a roller disposed above the band knife for holding the cake against upward movement to prevent its being split unevenly; an abutment carried by the cake-pushing member for holding the cake against sidewise movement during the splitting action and thus prevent it being broken, and a knife scraping unit for cleaning the knife.

Referring to the drawings, 1 indicates a frame, 2 a motor mounted thereon, 3 a reduction unit operatively connected to the motor and having a drive shaft 4 rotatable in bearings on the frame. A worm 5 near one end of the drive shaft meshes with a worm wheel 6 on one end of a transverse shaft 7 which has a crank 8 on its other end connected by a link 9 with a lever 10 having its lower end pivoted to the frame at 11. The upper end 12 of the lever is connected by a pin and slot connection with a cake pushing member in the form of a block 13. The block is slidably reciprocated by lever 10 within a cake receiving channel 14. This channel is formed by a base plate 15 supported by a pair of frame brackets 16, and a pair of guides 17 secured to the plate by bolts 18. Plate 15 has a slot 19 through which lever 10 extends to allow swinging movement thereof. Block 13 is movably connected at its opposite sides with guides 17 by rollers 18ª, fitting within a slot 20 in each guide. The forward end of the block has a groove 21 to allow the block to push split layers of cake past the band knife 22 without engaging it.

To prevent the cake from working its way upwardly and thereby causing the layers to be split unevenly, a roll 23 is disposed above the cutting edge of the band knife for holding the cake against upward movement. The roll is mounted to permit a limited freedom of vertical movement to insure its riding over the cake, and its support is adjustable vertically so that it may be normally positioned at different heights to allow different thicknesses of cake to pass thereunder. This mounting for the roll preferably consists of a pin 24, on which the stud shafts 25 of the roll rest and which may be placed in either of a vertically disposed series of holes 26 in a U-shaped bracket 27 secured to guides 17.

The band knife 22 is mounted on a pulley 28 on the end of drive shaft 4 and on a pulley 29 on the end of a parallel idle shaft 30 rotatably mounted in bearings on the frame. As the cake is forced against the band knife, it tends to shift the knife off the pulleys. To prevent this, I provide, at opposite sides of the cake cutting portion of the knife, a pair of rollers 31 engaging the dull edge of the knife. A knife guide 32 is provided to prevent the band from vibrating.

A pair of knife scraping blades 33, disposed at opposite sides of the knife, are mounted on a bracket 34 secured to the base plate. These blades remove the crumbs which adhere to the knife as it cuts the cake.

The cake is prevented from being shifted sidewise by the friction between the knife and the cake, and possibly broken, by abutments 35 on block 13 against which the cake abuts.

To adjust the machine for splitting cakes of different thicknesses, I provide a plurality of plates 36 which may be inserted between base plate 15 and guides 17 by unscrewing securing bolts 18 and slipping plates 36 under the guides so that the plates will abut each other as shown at 37 and will coincide with the slot 19 of base plate 15. These plates provide an elevated face on which the cake is moved toward the knife, and the proper number of these plates will elevate the cake to such height that the knife will split it in the center. Roll 23 is then adjusted so that it will engage the cake and hold it against upward movement.

The operation is as follows:

Assuming that the band knife is moving in the direction of the arrows, a cake is placed between a guide 17 and abutments 35. The block, being moved toward the knife, will slide the cake on plates 36 against a swiftly moving knife 22 which will split it centrally. During the splitting action, roll 23 keeps that part of the cake which is being split, from working upward and causing the cake to be split unevenly. Abutments 35 prevent the cake from being shifted sidewise as it is pulled in the direction of the moving knife by friction between it and the cake. Groove 21 allows block 13 to move the split cake past the knife without engagement between the block and the knife. The split cake is then removed from the machine and the block returned to its former position.

The machine works rapidly and efficiently and splits the cakes evenly with practically no breakage.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In a cake-splitting machine, a horizontal bed, a band knife disposed parallel thereto, mechanism for moving said knife, a follower for moving the cake through the path of the knife, means for moving the follower, means attached to said follower for holding the cake against lateral movement, and means to vary the thickness of the cut; said follower having slots formed therein to provide clearance for the knife.

2. In a cake-splitting machine, a horizontal bed, a band knife disposed parallel thereto, mechanism for moving said knife, a follower for moving a cake through the path of the knife, mechanism for moving the follower, a guide attached to said follower adapted to hold the cake against lateral movement, and means mounted above the knife to hold the cake against upward movement during the splitting action.

3. In a cake-splitting machine, a supporting bed having a channel, a band knife extending across the channel, mechanism for moving the same, a block mounted in the channel for moving the cake through the path of the knife, means for moving the block, and means for holding the cake against lateral and upward movement during the splitting action.

4. In a cake-splitting machine, a supporting bed having a channel, a knife extending across the channel, mechanism for moving same, a block movable in the channel for moving the cake through the path of the knife, a lever connected with the block, and mechanism for swinging the lever.

5. In a cake-splitting machine, a supporting bed having a channel, a knife extending across the channel, mechanism for moving the same, a block movable in the channel for moving the cake through the path of the knife, a lever connected with the block, a crank operatively connected for swinging the lever, and means for rotating the crank.

6. In a cake-splitting machine, a supporting bed having a channel, a knife extending across the channel, mechanism for moving the same, a block movable in the channel, means for moving the block, and means mounted above the knife for holding the cake against upward movement during the splitting action.

7. In a cake-splitting machine, a supporting bed having a channel, a knife extending across the channel, mechanism for moving the same, a block movable in the channel, means for moving the block, means mounted above the knife to hold the cake against upward movement during the splitting action, and means for adjusting the position of said means vertically.

8. In a cake-splitting machine, a supporting bed having a channel, a knife extending across the channel, mechanism for moving the same, a block movable in the channel, means for moving the block, means mounted above the knife for holding the cake against upward movement during the splitting action, said means being free to move upwardly.

9. In a cake splitting machine having a bed and a band knife movably mounted parallel to the bed; a bracket mounted on the bed and having flanges extending at an angle from each side of the knife, and a pair of blades slidably adjustable on the flanges of the bracket and engaging each side of the knife for scraping crumbs therefrom.

10. In a splitting machine having a band knife movably mounted thereon, a bracket on the machine, and a roller on the bracket; the bracket and roller being so positioned that the back of the knife may move diagonally across the face of the roller whereby the knife will rotate the roller and the roller will hold the knife in cutting position.

11. In a cake splitting machine having a bed and a band knife movably mounted parallel to the bed; a bracket on the bed, a pair of elongated members adjustably mounted on the bracket at either side of the knife, and a plurality of bearing surfaces on each member adapted to engage the knife and prevent same from vibrating; one of the bearing surfaces being opposite the point where the member is attached to the bracket and another bearing surface being spaced therefrom.

12. In a cake splitting machine, a horizontal bed, a band knife disposed parallel thereto and adapted to move transversely thereof, mechanism for moving said knife, means movable longitudinally of said bed for moving a cake through the path of the knife, means for moving said cake-moving means, and means for holding the cake against lateral movement during the splitting operation.

13. In a cake splitting machine, a horizontal bed, a band knife disposed parallel thereto and adapted to move transversely thereof, mechanism for moving said knife, means movable longitudinally of said bed for moving a cake through the path of the knife, means for moving said cake-moving means, a guide for holding the cake against lateral movement during the splitting operation, and means mounted above the knife for holding the cake against upward movement during the splitting operation.

In testimony whereof I have signed my name to this specification.

JOHN R. LITTY.